June 21, 1938. H. M. ROBINSON 2,121,366
BRAKING MECHANISM
Filed Feb. 4, 1936 3 Sheets-Sheet 1
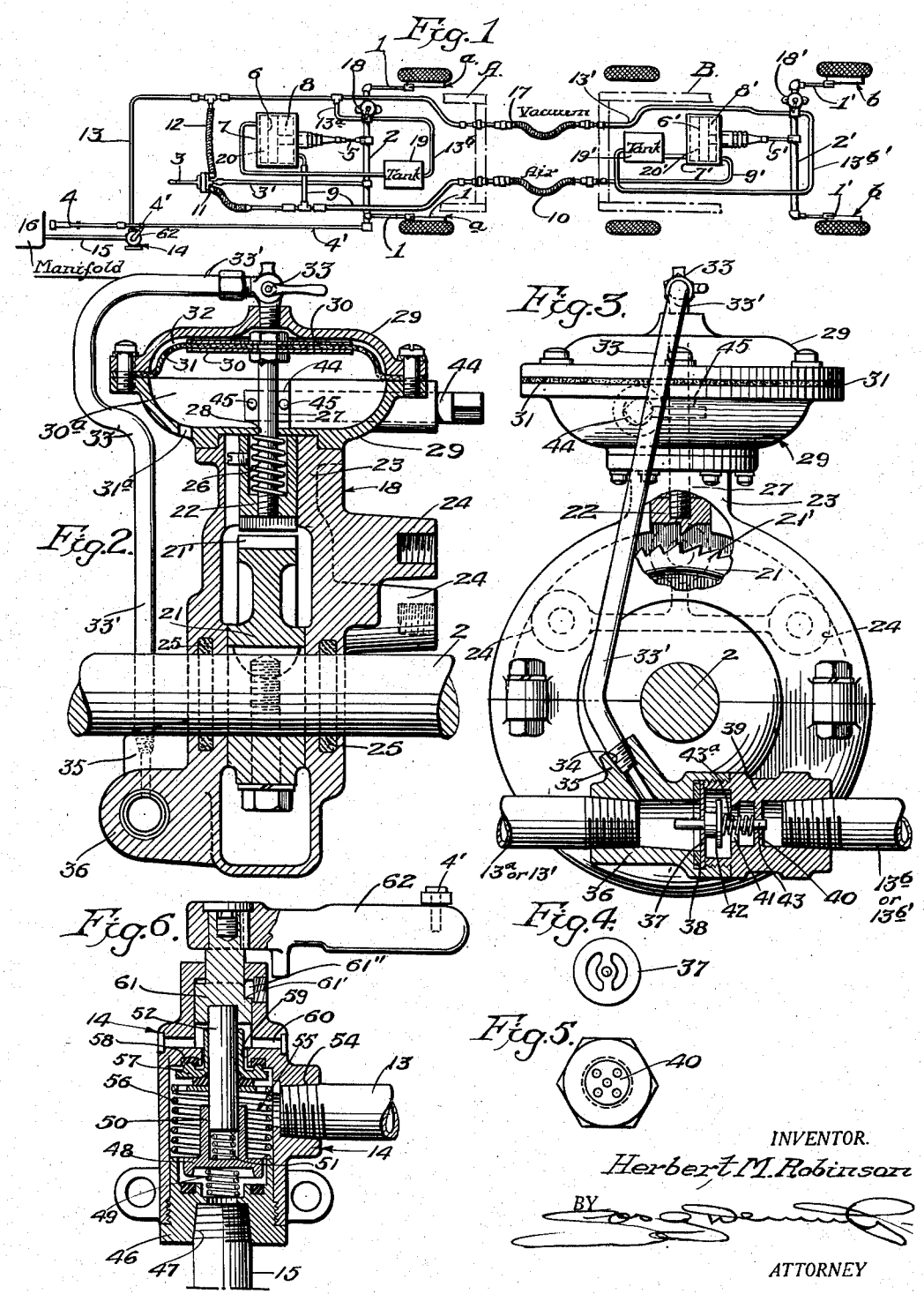
INVENTOR.
Herbert M. Robinson
BY
ATTORNEY

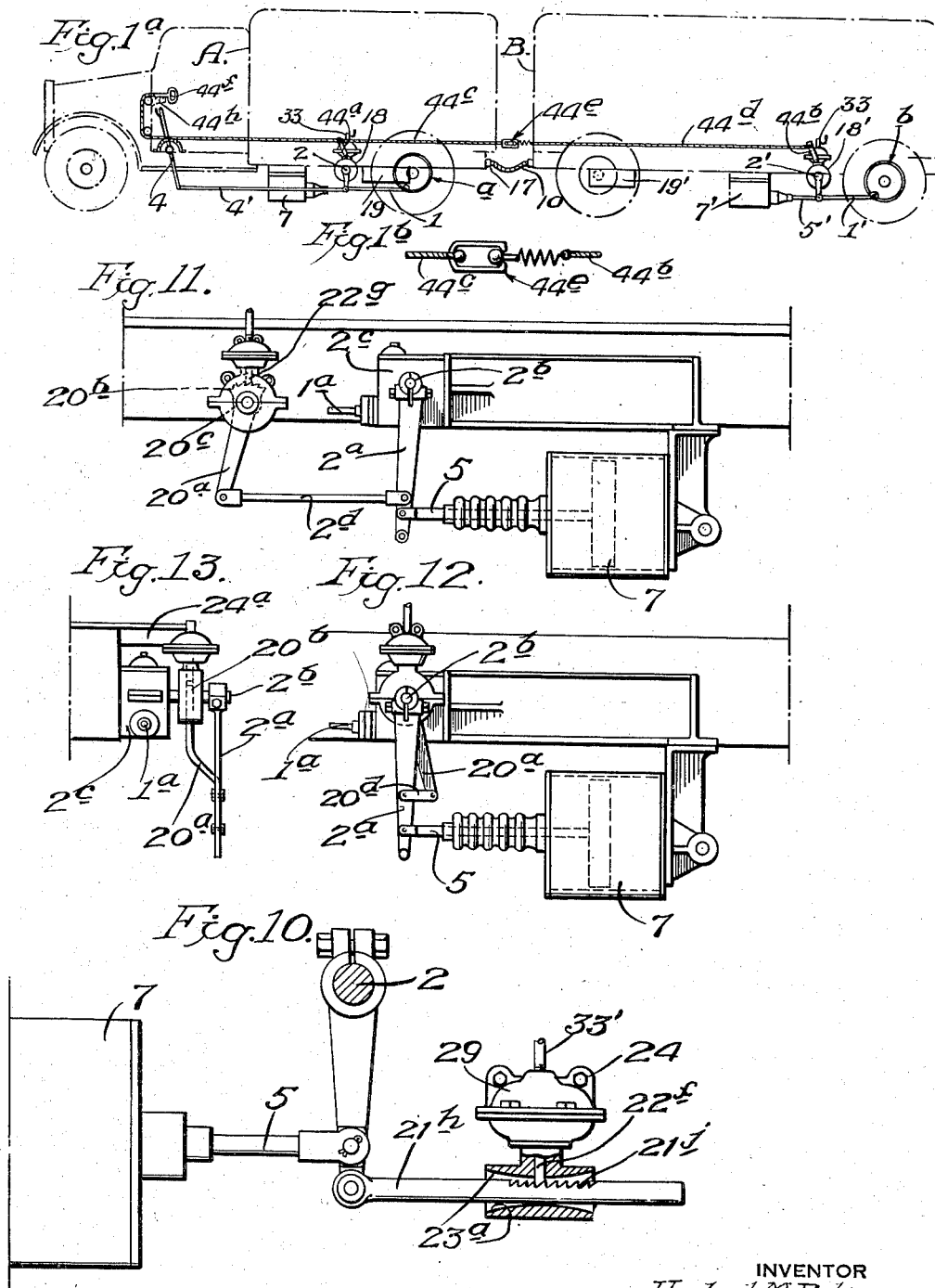

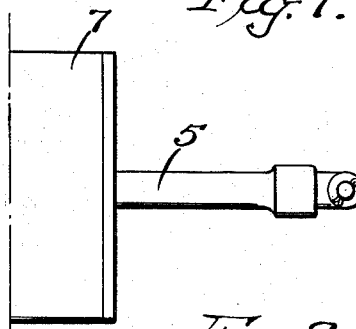
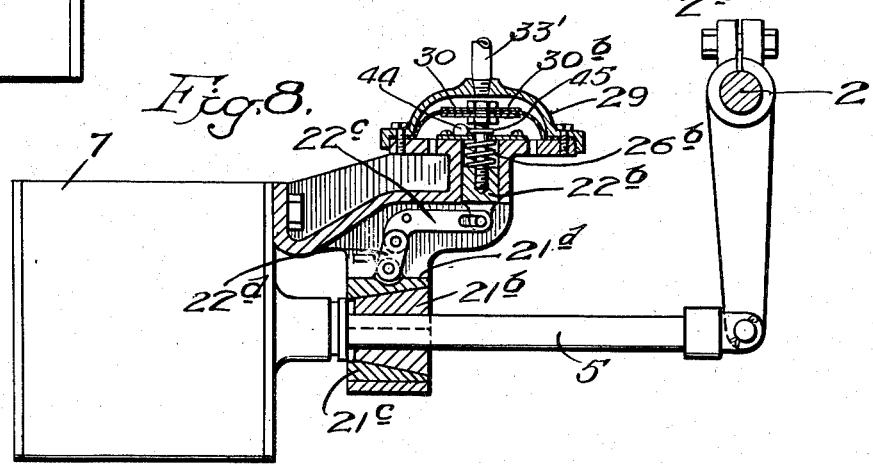
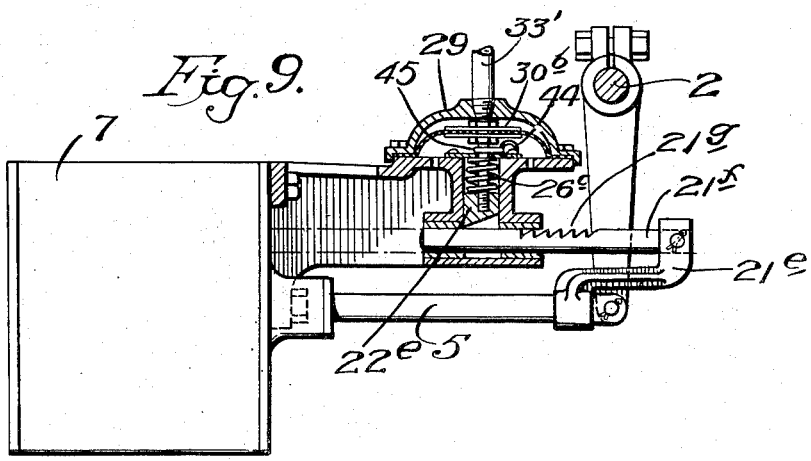

Patented June 21, 1938

2,121,366

UNITED STATES PATENT OFFICE 2,121,366

BRAKING MECHANISM

Herbert M. Robinson, Philadelphia, Pa., assignor to American Die & Tool Company, Reading, Pa., a corporation of Pennsylvania Application February 4, 1936, Serial No. 62,263

5 Claims. (Cl. 188—3)

My invention relates to the braking of wheeled vehicles, and primarily to the automatic locking of brakes in the applied or "on" position upon the occurrence of emergencies such as the accidental rupture of the connection between a truck and trailer having automatic means for temporarily applying the brakes upon the occurrence of such accident. In the normal operation of the vehicle or vehicles, the brakes may be applied and released entirely independently of the locking mechanism and without any actuation of such locking mechanism. Preferably the brake locking mechanism is additionally operable under control of the truck driver when it is desired to hold the brakes in the applied position for a considerable time.

My invention is particularly applicable to vehicular brake systems operated in whole or in part by unbalanced pressure created by the operation of an internal combustion engine used for propelling the vehicle.

In the braking of motor vehicles, it is common practice to actuate the brakes mechanically or hydraulically by a piston contained in a "power cylinder" connected with the engine manifold. The connection of the power cylinder with the manifold may be such that the piston may be atmospherically suspended or may be vacuum suspended. In the former case, suction is applied to one end of the power cylinder to apply the brakes, whereas in the latter suction is normally applied to both ends of the power cylinder and the brakes are operated by cutting off the vacuum from and admitting air to one end of the power cylinder. The direct suction action of the manifold on the power cylinder is preferably supplemented or augmented by a "booster" vacuum tank, which is capable of maintaining a sufficient vacuum in one end of the power cylinder to permit the actuation of the brakes by atmospheric pressure in the opposite end of the power cylinder. My brake locking mechanism is especially designed for use in conjunction with vacuum suspended brake systems having booster vacuum tanks on both the truck and trailer, but is applicable to single vehicles and certain of the features of my invention are applicable to other types of brake systems, such as those dependent for actuation on electrical or mechanical sources of power.

When brakes are locked in accordance with my invention, they are held in braking position regardless of the stoppage of the engine or failure of the lines communicating with the manifold, and in the event a trailer breaks loose from its truck, the brakes are automatically applied and locked on both the trailer and the truck. The locking mechanism may be released by the reestablishment of the vacuum system or manually.

Preferably the locking mechanism comprises a fastener, such as a pawl, jaw or bolt, complementary to a coacting part of the brake rigging and biased toward engagement therewith by a spring whose biasing tendency is normally overcome by a diaphragm or piston retracted in a chamber by the connection of such chamber with the vacuum system, preferably between the booster tank and manifold, but the biasing action of the spring may be otherwise overcome, as for instance by a manually operable tension member.

The characteristic features and advantages of my improvements will further appear from the following description and the accompanying drawings in illustration thereof.

In the drawings, Fig. 1 is a diagrammatic view illustrating a truck and trailer having applied thereto brake locking mechanism in accordance with my improvements; Fig. 1a is a diagrammatic side elevation of the truck and trailer combination illustrated in Fig. 1 illustrating the retraction of the brake lock by means of a tension member, parts being omitted for the sake of clearness; Fig. 1b is a detail of the tension member coupling shown in Fig. 1a; Fig. 2 is a vertical sectional view of a form of brake lock embodying my improvements; Fig. 3 is a side elevation of the apparatus shown in Fig. 2, taken at right angles thereto, and with parts broken away for clearer illustration; Figs. 4 and 5 are details of a coupler on the lock housing; Fig. 6 is a vertical sectional view of a form of valve mechanism for controlling the admission of air or vacuum to the lines of the brake system; Fig. 7 is a fragmentary diagrammatic view, part sectional, illustrating the application of locking mechanism embodying my improvements to a longitudinally movable brake rigging member; Fig. 8 is a diagrammatic fragmentary view, partly in section, illustrating a modified form of locking mechanism utilizing a jaw for securing a longitudinally movable member of the brake rigging; Fig. 9 is a diagrammatic fragmentary view, partly in section, illustrating a modified mounting for a locking mechanism for securing a longitudinally movable brake rigging member; Fig. 10 is a diagrammatic fragmentary view, partly in section, illustrating the mounting of a locking mechanism to control a brake rigging member having a longitudinal and rocking movement; Fig. 11 is a diagrammatic fragmentary view illustrating a mounting of the brake lock similar to that shown in Figs. 2 and 3 for controlling a hydraulic brake system operable through a vacuum system; Fig. 12 is a fragmentary diagrammatic side elevation showing a modified form of mounting of the brake lock mechanism shown in Fig. 11 for controlling a hydraulic brake system operable through a vacuum system; and Fig. 13 is an end view of the mechanism shown in Fig. 12.

As illustrated in Figs. 1 and 1a, a truck A and trailer B are respectively provided with traction wheels having brake drums a and b against which brake shoes are expanded or contracted in any usual manner, as for instance by usual hydraulic brake mechanism or by cams operated by links 1 and 1'.

The master piston of the hydraulic mechanism or the cam links 1 and 1' may be operated in a usual manner, as for instance by rocking shafts 2 and 2'. The brake shaft 2 may be rocked manually through a usual foot pedal 3 and connecting rod 3', connected with a radially projecting arm on the rocking shaft 2. The shaft 2 may also be rocked manually by an emergency brake lever 4 and connecting rod 4' connected with a radial arm on the shaft 2.

The shafts 2 and 2' may be rocked in a usual manner through downwardly projecting radial arms thereon which are pivotally connected with piston rods 5 and 5' having piston heads 6 and 6' which are disposed in the power cylinder 7 and 7' of a conventional vacuum suspended brake system.

The rear chambers 8 and 8' of the power cylinders communicate with tube sections 9 and 9' which may be coupled together by a coupling tube section 10. The tube section 9 is connected through a usual valve 11, operated by the foot pedal 3, with a tube 12, communicating, through a tube 13, valve 14 and tube 15, with a manifold 16 of the internal combustion engine for driving the truck A.

The tube 13 is coupled to the tube section 13' of the trailer B by means of a usual tube coupling section 17. The tube 13 communicates through the branch 13a, with a fitting communicating with a brake lock 18, and the tube 13' communicates with a fitting communicating with a similar brake lock 18'. The fittings communicate through tubes 13b and 13b' with the booster vacuum tanks 19 and 19', which communicate with the forward chambers 20 and 20' of the power cylinders 7 and 7'.

In the embodiment of my invention illustrated in Figs. 2 to 5, inclusive, the brake locks 18, 18', each comprises a disk segment 21 secured to movable parts of the brake rigging, such as the rocking shafts 2 and 2'. The peripheries of the disk segments are provided with ratchet teeth 21' adapted to cooperate with toothed pawls 22, reciprocable in housings 23, having means such as bosses 24 for bolting them to a fixed part of the truck or trailer. Each housing 23 encloses a member 21 and dust guards 25 prevent ingress of dust between the brake shafts and the housing bearings adjacent thereto.

Each pawl 22 is normally biased towards its complementary ratchet 21', as by a compressed spring 26 coiled around the rod 27 threaded into the pawl. One end of the spring 26 bears against the pawl and the other end of the spring bears directly or indirectly against a casing 29 bolted to the top of the casing 23 and containing an aperture 28 for the passage of the rod 27.

The rod 27 has fixed thereto an actuating member such as a head formed from the disks 30 and flexible diaphragm 31 having its periphery gripped between the flanges of the casing 29.

The chamber 30a within the casing 29 communicates with atmosphere through a port 31a. A two way valve 33 is set in the top of the casing 29 and by moving the handle of this valve the chamber 32 may be placed in communication with atmosphere or with a tube 33' which communicates with a port 34 in the boss 35 of a fitting 36, into which is threaded the branch 13a of the tube 13 or the tube 13'.

A perforated washer 37 is inserted between a seat 38 of the fitting 36 and the end of a coupling 39 which is screwed into the fitting 36. The coupling 39 contains the apertured diaphragm 40 and a port 41, which is controlled by a valve 42, mounted on a stem 43, supported by the washer 37 and the diaphragm 40. The valve is normally biased toward unseated position by a coiled spring 43a. The end of the coupling 39 has screwed therein one end of the tube 13b or 13b', which communicate at their other ends with the respective vacuum tanks 19, 19'. When the tubes 13a and 13' are under vacuum, the spring 43a unseats the valve and permits exhaustion of the tube 13b and tank 19. When air is admitted to the tube 13a it closes the valve 42, which prevents the flow of air into the tube 13b and tank 19.

A shaft 44 is journalled in the casing 29 and provided with eccentric fingers 45 on opposite sides of the stem 27. Such fingers may be engaged with and lift the piston disks 30 by rotating the shaft 44 if, for any reason, manual or mechanical retraction of the pawls is desired. The turning of the shaft 44 rocks the ends of the finger 45 upward and such upward movement lifts the disk 30 engaged thereby. As illustrated in Figs. 1a and 1b, the manual retraction of the pawls may be effected from the driver's seat by securing arms 44a and 44b on the squared ends of the shafts 44 and attaching to such arms the tension members 44c and 44d connected by the slip coupling 44e. The coupling comprises a socket having yielding jaws and a ball normally held by such jaws with sufficient firmness to permit the driver to operate the arms 44a and 44b by pulling on the knob 44f connected with the tension member 44c. If desired, the tension member 44c may be held in pawl-retracting position by a clamp or grip 44h on the dashboard. In such case, the valves 33 may be turned to connect the chambers 32 with atmosphere instead of with the vacuum system. Preferably, however, the manual operation of the pawl is resorted to only in emergencies and the tension members are normally left slack and the pawl actuated entirely through the vacuum system either through the rupture of the couplings 17 or the operation of the valve 14.

The valve 14 (Figs. 1 and 6) may be a usual three-way valve or may consist of a casing having a ferrule 46 screwed into the bottom thereof and containing a threaded port 47 into which is screwed an end of the vacuum line 15. A flanged valve disk 48 is supported by a compressible spring 49 in position to control the port 47. The valve disk 48 has a hollow stem 50 containing a compressible spring 51 and a rod 52 oscillatable therein and engaging the upper coil of the spring 51. A port 54, in the valve body 14, has threaded therein an end of the line 13 and communicates with a chamber 55 containing a coiled spring 56, which has one end bearing against the top of the ferrule 46 and the other end pressing a disk valve 57 adapted to coact with the seat 58 to control the port 59 from the chamber 55. The port 59 communicates through the ports 60 with the atmosphere. The rod 52 is slidable through the hub of the valve 57 and the rod 52 and the valve 57 are movable downwardly by a rotatable head 61 having a cam surface 61' coacting with the shank of a screw 61" in the top of the casing 14. The turning of the head 61 by the lever 62 moves the head 61 downwardly and, by its engagement with the rod 52 and later engagement with the top of the hub of valve 57, effects first the seating of the valve 48 and thereafter the unseating of the valve 57. The lever 62 may be manually operated directly or through connection with the link 4'.

In the normal operation of the equipment, the lever 62 is turned so that the head 61 is at the top of its movement, the valve 57 is seated by the spring 56 to close the port 59 and the valve 48 is biased to open position by the spring 49, so that the suction from the manifold evacuates air through the pipe 15 and valve 14 from the tube 13 and all parts communicating therewith. Under these conditions, air is exhausted from the chamber 32 and the pressure of air admitted through the port 31a elevates the piston members 30 and 31 against the action of the spring 26 and the pawl 22 is held out of engagement with the ratchet 21' of the brake lock. The air is also evacuated from the tanks 19 and 19' and from both ends of the power cylinders 7 and 7' so that the piston heads 6 and 6' are held in a suspended position and the brakes are disengaged by the usual brake retracting springs (not shown).

For ordinary braking, while the vehicles (Fig. 1) are moving and the engine is running, the foot pedal 3 may be actuated to operate the valve 11 and admit air into the tubes 9, 10, and 9' in the usual manner. The atmospheric air thereby admitted to the chambers 8 and 8' of the power cylinders force the pistons 6 and 6' forwardly due to the evacuation of the chambers 20 and 20' through the vacuum maintained in the tanks 19 and 19' through the tubes connecting the tanks with the manifold. When the brake pedal is released, the valve 11 cuts off ingress of air to the tube 9 and reestablishes communication between the tube 9 and tube 12 in the usual way so that the chambers 8 and 8' are evacuated and the brakes released. For such temporary braking with the engine running and the operator in his normal position, the use of a brake lock is unnecessary and may be undesirable. But it will be observed that the brakes cannot be held in the "on" position if the foot pedal is released or the engine stopped for a considerable time sufficient for destroying the vacuum in the tanks 19 and 19' by the leakage of air.

With vehicles thus or similarly equipped in accordance with my improvements, if it is desired to hold an application of the brakes for a considerable time, the lever 62 is turned to force the head 61 toward its lower position, thereby depressing the rod 52 to seat the valve 48 and then unseating the valve disk 57 so as to admit air through the ports 60 and 59 into the tube 13. The downward movement of the rod 52 so compresses the spring 51 that it overcomes the spring 49 and seats the valve 48 so as to shut off the tube 13 from the manifold. The admission of air into the tube 13 breaks the vacuum in the chambers 8 and 8' and forces the piston heads 6 and 6' forward as before to set or further set the brakes. Simultaneously the air admitted to the tube 13 breaks the vacuum in the chamber 32 so that the springs 26 advance the pawls 22 into engaging position, permitting the ratchet teeth 21' to slide under the pawls in the brake applying movement but preventing the reverse movement. The admission of the air to the tubes 13 and 13' seats the valves 42 so as to close the ports 41 and prevent the admission of air into the booster vacuum tanks.

By moving the lever 62 to the reverse position, the valve 57 is seated and the valve 48 is unseated so as to establish communication between the manifold 16 and all parts of the system connected therewith. This evacuates the air from the chamber 32 and causes the piston members 31 and 31' to rise and disengage the pawl 22 from the ratchet teeth 21', as well as release the brakes. Should it be desired to release the lock manually this may be done by turning the shafts 44 through the tension members described.

Should the trailer B break loose from the truck, thereby breaking the tubes 10 and 17 and admitting air to both sides of the system, the brakes will be applied and locked on both truck and trailer in the same manner as described when air is admitted to both sides of the system through the three-way valve mechanism 14.

If the valves 33 are turned so as to cut off communication between the chamber 32 and the vacuum system, the tension member 44c is clamped in such a position that the arms 44a and 44b are turned to normally hold the pawls in elevated position. Should the trailer break loose from the truck, the coupling ball pulls out of the yielding jaws of the coupling 44e thereby slackening both tension members and permitting the pawls to be moved into engaging position by the biasing action of their springs. If the driver should desire to drop the pawls into engaging position at any other time, he may do this by releasing the grip of the clamping member 44h on the tension member 44c and permitting the slackening of the tension members and the resultant movement of the pawls by the expansion of their biasing springs.

As shown in Fig. 7, the power piston rod 5 may be connected with a radial arm on the shaft 2 through a rectilineally movable link or shaft 2a provided with teeth 21a adapted to be locked when the brake is applied by a pawl 22a normally biased toward engaging position by a coiled spring 26 thereon and retractable through the piston 30a by the pneumatic or manual mechanism hereinbefore described.

As illustrated in Fig. 8, the piston rod 5, pivotally connected with an arm of the shaft 2, has slidably mounted thereon a split cone 21b which may be gripped between a fixed jaw 21c and a movable jaw 21d by the movement of a plunger 22b acting through the toggle lever 22c and link 22d. The plunger 22b is normally biased toward jaw-closing position by the biasing spring 26b and may be retracted pneumatically or mechanically in the manner hereinbefore described through the head 30b. In this instance the casing for the lock is mounted on a bracket attached to the power cylinder instead of to the chassis frame as in the previous instances.

As illustrated in Fig. 9, the piston rod 5, pivotally connected to the arm of the shaft 2, has connected therewith a bracket 21e having a rectilineally movable shaft 21f pivotally connected therewith. The shaft 21f is provided with teeth 21g adapted to be engaged by the pawl 22e. The pawl is normally biased toward engaging position by the spring 26c as hereinbefore described, and may be retracted pneumatically or mechanically as hereinbefore set forth.

As illustrated in Fig. 10, the radial arm through which the shaft 2 is connected with the piston rod 5 may have pivotally connected therewith an extension rod 21h provided with teeth 21j adapted for coaction with the pawl 22f of a locking mechanism similar to that shown in Fig. 7 but provided with a lower casing section having a slideway with arcuate walls 23a permitting the rocking of the extension rod 21h when the shaft 2 is rocked by the piston rod 5.

As illustrated in Fig. 11, the piston rod 5 instead of acting through mechanical rigging upon the brake shoes is connected with the operating lever 2a fixed to the shaft 2b and operating a piston in the master cylinder 2c of a usual form of hydraulic brake system from which fluid under pressure is forced in the usual manner through tubing 1a to the wheel cylinders (not shown). The arm 2a is pivotally connected through the link 2d with an arm 20a of a toothed segment 20b journalled on a boss 20c and adapted for engagement with a pawl 22g which is operable mechanically or pneumatically in the manner hereinbefore described to lock or release the brake mechanism.

As illustrated in Figs. 12 and 13, the locking mechanism may be mounted to control a hydraulically operated braking mechanism by journalling the segment 20b on the shaft 2b between the master cylinder 2c and the arm 2a. The casing of the lock may be secured by a bracket 24a to a fixed frame member and the segment arm 20a may be pivotally connected by a link 20d to the arm 2a.

It will be understood that when the locking mechanism is mounted to control a combined vacuum-hydraulic brake system, the lock will secure the piston operated member of the main hydraulic cylinder in such position as to maintain brake applying pressure on the liquid in the master cylinder, and therethrough on the fluid in the wheel cylinder.

While I have described particular embodiments of my invention, I do not desire to limit myself to such constructions but only by the scope of the appended claims. The locking device may be variously located so long as it holds the brakes in the applied position. Other locking means than a pawl and ratchet or jaws may be employed.

Having described my invention, I claim:

1. The combination with a traction vehicle and a trailing vehicle connected therewith, of means for automatically braking the trailing vehicle upon the rupture of the connection between the vehicles, means for automatically locking said braking mechanism upon the application thereof resulting from such rupture, and means on the traction vehicle for controlling said locking means during the connection of said vehicles independently of the operation of the aforesaid braking means.

2. The combination with a traction vehicle and a trailing vehicle connected therewith, of means including a fluid pressure system for braking each of said vehicles, locking mechanism for locking said braking means in the applied position, and fluid pressure means for controlling said locking mechanism from the traction vehicle independently of said fluid pressure system.

3. The combination with a traction vehicle and a trailing vehicle connected therewith, of means including a fluid pressure system for braking each of said vehicles, locking mechanism for automatically locking said braking means in the applied position upon the rupture of said connection, means on said traction vehicle for operating said locking mechanism, and means on said traction vehicle for operating said braking means independently of said locking mechanism.

4. In a braking system, a brake, a shaft for operating said brake, a locking member connected with said shaft, a locking member movable into and out of engagement with said first named locking member, a piston connected with said second named locking member, a piston connected with said shaft, fluid pressure mechanism for operating said pistons and including a tube communicating with one side of the first piston and with one side of the second piston, a check valve controlling communication through said tube between said first piston and second piston, means for exhausting air from said tube, and a valve for admitting air to a portion of said tube.

5. In a braking system, a brake, a shaft for operating said brake, a piston connected with said shaft, a cylinder in which said piston is movable, a lock having a member connected with said shaft and a member movable relatively thereto, a piston connected to said movable member, a cylinder in which said last named piston is movable, means for exhausting air from both sides of said first named cylinder and from one side of said second named cylinder, and valve mechanisms for admitting air to the exhausted side of said second named cylinder and to one side of said first named cylinder and for preventing the admission of air to the other side of said first named cylinder.

HERBERT M. ROBINSON.